Aug. 21, 1956 — R. H. BURGESS — 2,759,248
METHOD OF MAKING HEAT TRANSFER UNITS
Original Filed June 22, 1950
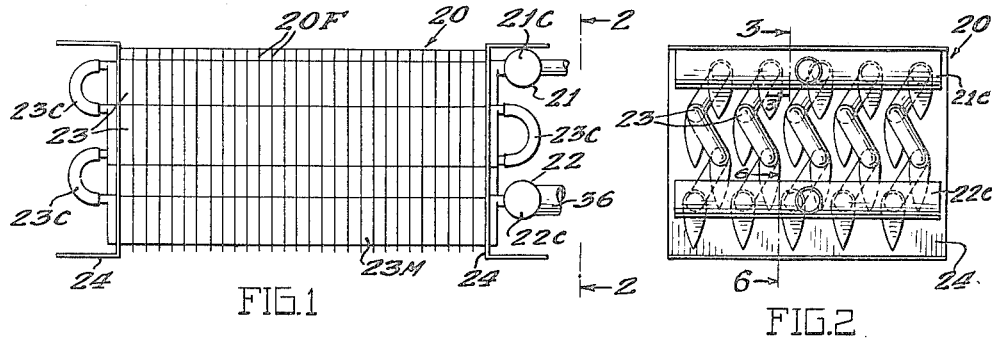
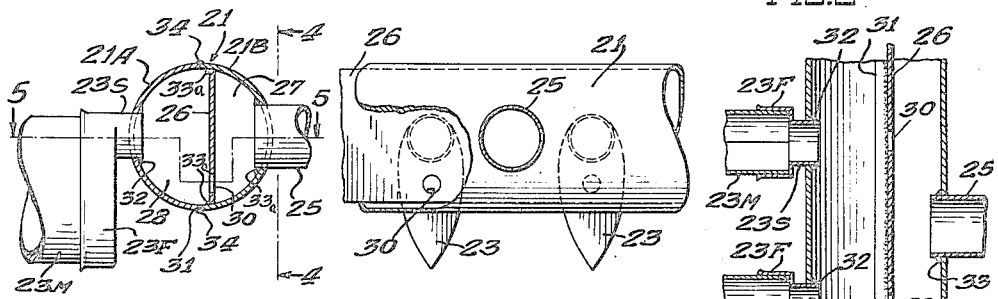
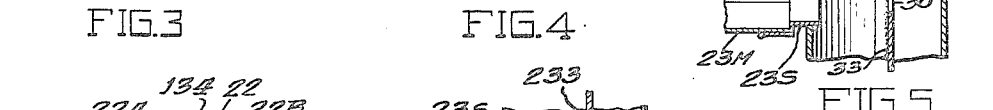
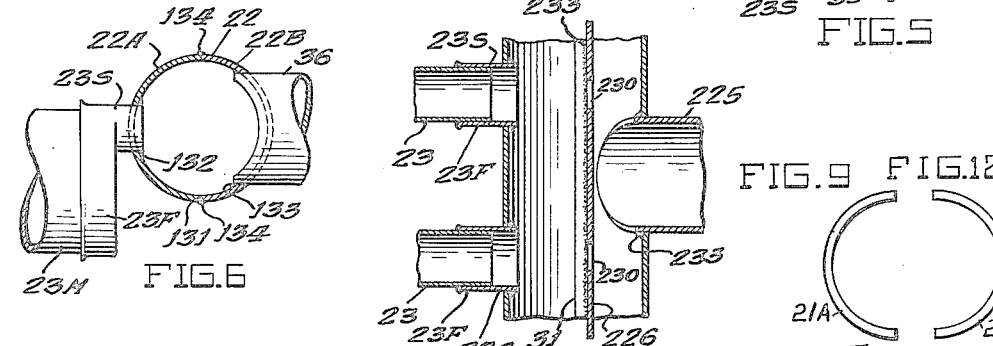
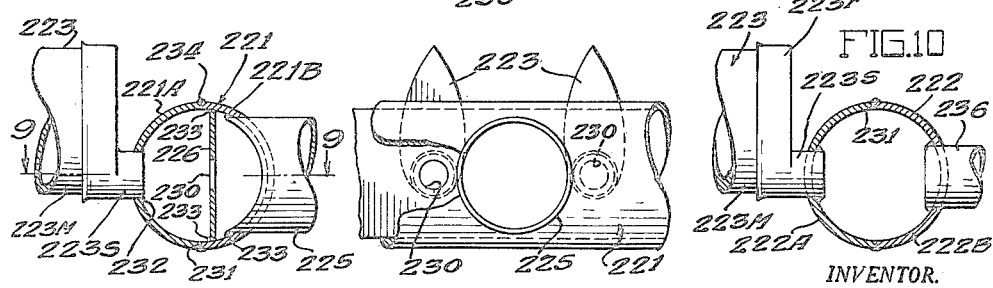
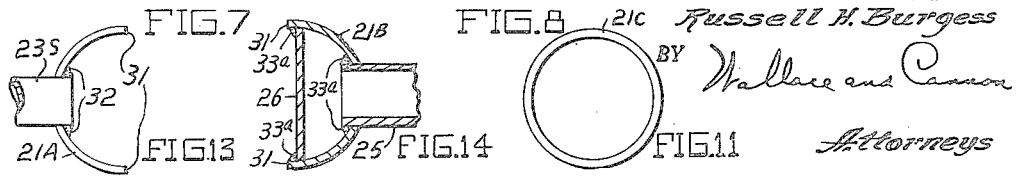
INVENTOR.
Russell H. Burgess
BY Wallace and Cannon
Attorneys

United States Patent Office 2,759,248
Patented Aug. 21, 1956

2,759,248

METHOD OF MAKING HEAT TRANSFER UNITS

Russell H. Burgess, Chicago, Ill.

Original application June 22, 1950, Serial No. 169,654. Divided and this application March 23, 1951, Serial No. 217,120

1 Claim. (Cl. 29—157.3)

This application is a division of my copending application, Serial No. 169,654, filed June 22, 1950.

This invention relates to heat transfer units and particularly to improvements in inlet manifold structures for such heat transfer units.

Heat transfer units that are utilized in the heating and refrigeration industry usually embody an outlet manifold that is connected to the outlet ends of a plurality of heat transfer tubes or coils. As to the inlet ends of such tubes, an inlet manifold is in many instances employed where equality of distribution of heat transfer fluid is not particularly important. However, where it is essential that the heat conveying fluid be supplied in equal amounts or equal rates to the respective tubes or coils of the heat transfer unit, as for example, in refrigeration systems, and particularly in the evaporators thereof, it has been customary to employ a structure that is known as a distributor which is associated with or a part of the expansion valve. This distributor in most instances consists of a large orifice to which a plurality of small tubes are connected so that each such tube may be extended to the inlet end of one of the tubes or the coils of the evaporator. The provision of a structure of this character involves considerable material and labor expense in the manufacture and assembly thereof and it also occupies considerable space, and such structure has long been considered to be objectionable for the foregoing and other reasons.

In view of the foregoing it is an important object of the present invention to enable the usual distributor structure to be eliminated, particularly in refrigerating systems, and a related object is to enable equal distribution of the heat transfer fluid to be obtained by means that are simple and economical in character. More specifically it is an object of the present invention to enable an equal distribution among the tubes of the heat transfer unit to be obtained by means that are incorporated and housed within an inlet manifold of the heat transfer unit. Further and related objects are to afford distributing means within the inlet manifold of the heat transfer unit in such a way that the assembly of the heat transfer unit is materially simplified while at the same time assuring the desired equality of distribution among the tubes or coils of the transfer unit.

A further object of this invention is to produce the distributor structure of this invention in a novel and efficacious manner.

Other and further objects of the present invention will be apparent from the following description and claims and are illustrated in the accompanying drawing which, by way of illustration, shows preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claim.

In the drawing:

Fig. 1 is a side elevational view of an evaporator embodying the features of the invention;

Fig. 2 is an end elevational view taken from line 2—2 in Fig. 1;

Fig. 3 is an enlarged fragmentary cross sectional view taken substantially along the line 3—3 of Fig. 2;

Fig. 4 is a view taken substantially along the line 4—4 of Fig. 3;

Fig. 5 is a plan sectional view taken substantially along the line 5—5 of Fig. 3;

Fig. 6 is a fragmentary vertical sectional view taken substantially along the line 6—6 of Fig. 2;

Fig. 7 is a view similar to Fig. 3 and illustrating the invention as applied to the inlet manifold of a condenser;

Fig. 8 is a view taken from the right to Fig. 7;

Fig. 9 is a fragmentary plan section taken substantially along the line 9—9 of Fig. 7;

Fig. 10 is a view similar to Fig. 6 and illustrating the outlet manifold of the condenser structure shown in Figs. 7, 8 and 9, and Figs. 11 to 14 illustrate the process of making a manifold of this type.

For purposes of disclosure the invention is herein illustrated in Figs. 1 to 6 of the drawing as embodied in an evaporator 20 having an inlet manifold 21 and a parallel outlet manifold 22 interconnected by a plurality of coils 23. As herein shown, it should be noted that the coils are illustrated as constructed and arranged in accordance with the disclosure of my prior Patent No. 2,431,228, patented November 18, 1947, but this form of the tubes, while considered to be important from the standpoint of performance in many situations of use, is not essential to the present invention.

Thus, as herein illustrated, the tubes 23 are of streamline or tear-drop form and each tube comprises a main section 23M, Figs. 1 and 3, and at the ends of each such main section, end fittings 23F are afforded. These end fittings 23F serve as end caps and fit over the ends of the main section 23M and are secured thereto as by brazing, and as embodied in an evaporator 20 such as that shown in Figs. 1 to 6, each end fitting 23F has a projecting end stub 23S of tubular form located adjacent to the wide or large end of the end of fitting 23F. In the evaporator 20, these tube assemblies are extended through fin plates 20F and are mounted in end frames 24 so that the end stubs 23S are located at the upper edge of the tubes. Each coil 23 is made up of a plurality of tube assemblies arranged in horizontal tiers and the tube assemblies of the upper tier have one end thereof associated with the inlet manifold 21 as will hereinafter be described in detail. The opposite ends of the tube assemblies of the upper tier are connected to the related tube assemblies in the next lower tier by U-tubes 23C that are associated with the adjacent end stubs 23S of such tube assemblies. Similar U-tube connections 23C are afforded at the right hand end of the evaporator unit between the last mentioned tube assemblies and the related tube assemblies of the next lower tier, and the same thing is true as to the left hand end of the unit where the lower tier of tube assemblies is connected with the related tube assemblies of the next higher tier. Finally, the right hand ends of the tube assemblies of the lower tier are associated with the outlet manifold 22 in a manner to be described hereinafter.

Under and in accordance with the present invention, the inlet manifold 21 is formed from an enlarged tubular member that incorporates means within such tubular member for effecting equal delivery of refrigerant liquid to the several tubes or coils of the evaporator. Thus, the inlet manifold 21 has end caps 21C and has a supply pipe 25 connected to one side of the manifold. The several end stubs 23S of the upper tier of tube assemblies are connected to the manifold 21 at the opposite side of and at spaced points along the manifold 21, and within the manifold 21 a vertically disposed longitudinally extending division wall 26 is provided, this wall being connected at its upper and lower edges to the side wall of the tubular inlet manifold 21 and being connected to or firmly abutted against the end caps 21C. The inlet manifold 21 is thus divided by the wall 26 into a first longitudinally extending chamber 27 and a second longitudinally extending chamber 28, the refrigerant liquid being delivered to the chamber 27 by the inlet pipe 25 directly from the usual expansion valve, and the several tubes 23 being connected to the passage 28. The passage 27, in the use of the evaporator, is maintained approximately one-half of refrigerant liquid and the inlet manifold 21 is of course arranged in a level position so that the liquid will be distributed uniformly throughout the length of the passage 27. This refrigerant liquid in the passage 27 is, of course, under uniform pressure as determined by the action of the expansion valve, and the liquid is fed equally to the several tubes or coils 23 by the provision of a plurality of independent supply orifices 30 that are formed in the lower portions of the wall 26 in positions directly opposite or in the vertical planes of the inlet stubs 23S of the several tubes or coils.

This arrangement, as above described, provides for equal distribution or flow of the refrigerant liquid to the several tubes or coils, and such structure is of such a character that the manufacture and assembly thereof may be readily and easily accomplished. Thus, a section of tubing, as illustrated in Fig. 11, at 21C of the proper size and material, as determined by the particular character of the refrigerant, is selected and is cut longitudinally in half, as indicated at 31 in Fig. 3 of the drawing. This affords two half-sections 21A and 21B as shown separately in Fig. 12, and the section 21A is drilled midway between the edges or joints 31 so that the ends of the stubs 23S may be extended therethrough, as shown in Figs. 3 and 5, and the inwardly projecting ends of the stubs 23S are thus exposed in convenient positions within the concave inner surface of the section 21A so that they may be brazed or otherwise secured in place as indicated at 32.

In the other section 21B, an appropriate opening is drilled to receive the inlet pipe 25, and in a similar way, the inwardly projecting end of this pipe 25 is exposed so that it may be secured in place as by brazing at 33.

The division wall 26 is formed from a flat rectangular piece of metal of proper width and length and the openings 30 are formed therein at appropriate points along a length thereof. The width of the plate or wall 26 is somewhat less than the diameter of the tube that forms the manifold 21, and thus this wall may be put in place just inwardly of the edges 31 of the section 21B and may then be conveniently secured in place by a process such as brazing as at 33A. The two sections 21A and 21B of the manifold 21 are thus completed, and are then put together in the relationship shown in Fig. 3 and are brazed or otherwise secured together along the joints 31 as indicated at 34. The end caps 21C are then put in place and are secured in position as by brazing so that the end caps abut the ends of this wall 26, thus to afford the two independent passages 27 and 28. It will be understood, of course, that where the parts are made from steel, the various joints or connections would, of course, be formed by welding.

The outlet manifold 22 is formed in the same general manner as the inlet manifold 21 with the exception, of course, that a longitudinal division wall is not utilized in this outlet manifold. Thus, the tubular member that is to form the outlet manifold 22 is cut as at 131 to afford two half-sections 22A and 22B, and the end fittings 23F are associated with the section 22A by brazing at 132 as hereinbefore described with respect to the section 21A. The other section 22B has an outlet pipe 36 associated therewith as by brazing at 133 in the same general manner as above described in connection with the mounting of the pipe 25 on the section 21B. The two sections 22A and 22B are then joined together as by brazing along the joints 131 as indicated at 134, and suitable end caps 22C are put in place and secured on opposite ends of the outlet manifold 22 as by brazing.

In Figs. 7 to 10 of the drawing, the invention is illustrated as embodied in a condenser and in this instance the condenser is provided with an inlet manifold 221 and an outlet manifold 222. Similar tubes 223 are provided, but in this instance the rotative position of the tubes 223 is reversed so that the end stubs 223S are located at the bottoms of the tubes. The inlet manifold 221 in this instance is similarly formed with a division wall 226 that is put in position in the same manner and in the same general relationship as hereinbefore described in respect to the other embodiment of the invention. Thus, the tube that is to form the manifold 221 is cut longitudinally in half as indicated by the joint 231 so that the end stubs of the upper tier of tube assemblies may be associated therewith in the general manner hereinabove described, which includes drilling of the section 221A and brazing of the end stubs 223S as indicated at 232. Similarly, the section 221B has a relatively large diameter inlet pipe 224 extending thereinto and secured as by brazing at 233. The tube sections 221A and 221B are then put together and brazed together as indicated at 234, and the ends are capped as hereinabove described.

In the application of the present invention to a condenser, the division wall 226 has openings 230 provided therein at longitudinally spaced points along the wall, such openings being aligned with the inlet ends of the respective coils. The openings 230, however, are disposed substantially midway between the top and bottom of the wall 226, for, in this instance, the fluid will be in gaseous form and it is desired to promote flow of such gaseous fluid to the respective coils.

The outlet manifold employed where the present invention is applied to a condenser is shown in Fig. 10 of the drawing, and in this instance the tube is similarly divided in the sections 222A and 222B to facilitate connection of the tube sections 223 and an outlet pipe 236. Similar processes of drilling and brazing are applied in the same manner as hereinabove described in connection with the outlet manifold 22, the only difference being in the rotative positions of the tubes 223 and in the diameter of the outlet pipe 236.

From the foregoing description it will be evident that the present invention provides for attaining equality of distribution of heat transfer fluids between the several coils of a heat transfer unit, and this equality of distribution is attained through the use of structure that is simple and economical in character and compact in its form. It will also be evident that the distributing structure whereby such equality of distribution is attained is applicable with equal facility to either evaporators or condensers, and such condensers may, of course, be used not only in refrigerator systems, but also in steam-heating systems and the like for heat transfer purposes.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claim:

I claim:

In the manufacture of heat exchange units embodying a plurality of coils having inlet ends and outlet ends and inlet and discharge manifolds connected to the respective inlet and outlet ends of the respective coils, the process which includes the steps of longitudinally splitting a tubular member to afford two half-sections, forming openings in one of said sections at longitudinally spaced points to receive the respective inlet ends of said coils, inserting the inlet ends into such openings and securing the same therein by bonding metal applied at the interior wall of the tube section, forming an opening in the wall of the other tube section, inserting the end of a supply tube into the latter opening and securing the same therein by bonding metal applied at the interior wall of said tube section, locating a longitudinal division wall of a width somewhat less than the diameter of the tubular member in said other section so as to extend throughout the length of said other of said sections and substantially equidistant from the edges of said section, securing the division wall to said other tube section by bonding metal applied along the side of the division wall closest to the tube section edges, said division wall being provided longitudinally thereof with distributing openings in spacings corresponding to the spacing of said first mentioned points, metallically bonding said tube sections together in their original relation, and securing end caps on the ends of the resulting tubular member in tight fitting abutment with the ends of the division wall.

References Cited in the file of this patent

UNITED STATES PATENTS

| | | |
|---|---|---|
| 266,680 | Doolittle | Oct. 31, 1882 |
| 388,867 | Hayden | Sept. 4, 1888 |
| 564,627 | Leyner | July 28, 1896 |
| 1,282,831 | Hewitt | Oct. 29, 1918 |
| 1,382,420 | Fuller | June 21, 1921 |
| 1,402,849 | Eggenweiler | Jan. 10, 1922 |
| 1,554,493 | Eggenweiler | Sept. 22, 1925 |
| 1,598,062 | Dienner | Aug. 31, 1926 |
| 1,623,064 | Napier | Apr. 5, 1927 |
| 1,671,351 | Curtis | May 29, 1928 |
| 1,767,005 | Miller | June 24, 1930 |
| 2,163,591 | Deverall | June 27, 1939 |
| 2,431,228 | Burgess | Nov. 18, 1947 |